(12) United States Patent
Iizuka

(10) Patent No.: US 7,137,102 B2
(45) Date of Patent: Nov. 14, 2006

(54) PROGRAM DEVELOPMENT DEVICE UTILIZING COMPONENT, PROGRAM DEVELOPMENT METHOD AND MEDIUM

(75) Inventor: Kunihiko Iizuka, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 583 days.

(21) Appl. No.: 09/785,207

(22) Filed: Feb. 20, 2001

(65) Prior Publication Data

US 2002/0019974 A1    Feb. 14, 2002

(30) Foreign Application Priority Data

Aug. 9, 2000    (JP) .............................. 2000-241656

(51) Int. Cl.
*G06F 9/44*    (2006.01)

(52) U.S. Cl. ...................... 717/121; 717/109; 717/113; 715/810

(58) Field of Classification Search ........ 717/120–122, 717/105, 109, 113; 715/517–521, 810; 345/762–765; 713/200

See application file for complete search history.

(56) References Cited

U.S. PATENT DOCUMENTS

| | | | | |
|---|---|---|---|---|
| 5,555,369 A | * | 9/1996 | Menendez et al. ........... | 345/762 |
| 5,764,226 A | * | 6/1998 | Consolatti et al. .......... | 715/747 |
| 5,850,548 A | * | 12/1998 | Williams .................... | 717/107 |
| 5,860,070 A | * | 1/1999 | Tow et al. ..................... | 707/8 |
| 5,897,635 A | * | 4/1999 | Torres et al. ................. | 707/10 |
| 5,950,001 A | * | 9/1999 | Hamilton et al. ........... | 717/107 |
| 5,978,579 A | * | 11/1999 | Buxton et al. .............. | 717/107 |
| 6,093,215 A | * | 7/2000 | Buxton et al. .............. | 717/107 |
| 6,182,278 B1 | * | 1/2001 | Hamada et al. ............. | 717/107 |
| 6,212,673 B1 | * | 4/2001 | House et al. ................ | 717/100 |
| 6,232,968 B1 | * | 5/2001 | Alimpich et al. ........... | 345/744 |
| 6,237,135 B1 | * | 5/2001 | Timbol ........................ | 717/107 |
| 6,421,653 B1 | * | 7/2002 | May ............................ | 705/37 |
| 6,591,366 B1 | * | 7/2003 | Munker et al. ............. | 713/200 |
| 6,633,888 B1 | * | 10/2003 | Kobayashi ............. | 707/103 R |
| 6,753,885 B1 | * | 6/2004 | Stoakley et al. ............ | 715/762 |

FOREIGN PATENT DOCUMENTS

| | | |
|---|---|---|
| JP | 09-120357 | 5/1997 |
| JP | 10-091449 | 4/1998 |

* cited by examiner

*Primary Examiner*—Kakali Chaki
*Assistant Examiner*—Trenton J. Roche
(74) *Attorney, Agent, or Firm*—Staas & Halsey LLP

(57) ABSTRACT

A program development device providing functions of developing a unitarily designed application program even when utilizing components, in which a multiplicity of interfaces can be used, and a multiplicity of combinations of these components can be provided. The program development device for developing the application program by use of the component having the plurality of interfaces, includes a component selecting module for having the component selected, an interface selection module for having the interface selected for the selected component, and setting the selected interface in a valid or invalid state, a recording unit for retaining a set record of having set the interface in the valid or invalid state, and a edit module for supporting the development of the program by use of the interface set in the valid state or the interface that is not set in the invalid state in accordance with the set record.

5 Claims, 14 Drawing Sheets

FIG. 6

```
[CommandButton.Events]
KeyDown=NoUse
KeyPress=NoUse
KeyUp=NoUse
MouseDown=NoUse
MouseMove=NoUse
MouseUp=NoUse
[CommandButton.Methods]
Move=NoUse
[ComboBox.Properties]
Style=2
[ComboBox.Methods]
Move=NoUse
          :
          :
```

FIG. 10

```
[GroupBox.OptionButton]

OptionButton=3

Alignment=Vertical

[Toolbar.CommandButton]

CommandButton=4
Alignment=Horizontal
        ⋮
        ⋮
```

PROGRAM DEVELOPMENT DEVICE UTILIZING COMPONENT, PROGRAM DEVELOPMENT METHOD AND MEDIUM

BACKGROUND OF THE INVENTION

The present invention relates to a program development technology utilizing components.

A user of software components (such as ActiveX control provided by Windows of Microsoft Corp., in U.S.A) is able to develop a program by laying out the components on a container (such as Visual Basic Form of Microsoft Corp.). The user can utilize all interfaces, for examples, properties, methods and events, which are open in the respective components.

Further, some of the components yield utility values by combining a plurality of components. In this type of components, the combination of these components can be utilized by setting interfaces of the individual component.

Moreover, on the occasion of an application program group-oriented development, a fixed template can be formed by making use of a template function. Then, this type of template has been used for an initial setting of the application.

As the functions of the components are more enriched nowadays, the number of the interfaces thereof becomes larger. While on the other hand, the users of the components do not necessarily utilize all the interfaces thereof.

On the contrary, it requires a tremendous labor such as elaborate read of a manual to search a target interface out of a great quantity of interfaces.

Further, when utilizing the combination of the plurality of components, for instance, in the case of using a group box plus option buttons, tool bar plus command buttons, and a tub plus property pages and property sheets, a mode of these combinations is fixed as the case may be. The user, however, must set the interfaces for each individual component even in such a fixed mode of combinations.

Moreover, in the case of developing the application on a group basis, the template at an initial stage of the development can be determined by utilizing the template function. At a stage of developing the target application from the template, however, all the interfaces of the components can be utilized. In addition, the mode of combining the component is diversified.

Therefore, the interface utilizing methods and the combination modes are not unified, with the result that an application design might often differ from others within the same group. Moreover, the non-unified utilizing method results in an inefficient maintenance of the program.

SUMMARY OF THE INVENTION

It is a primary object of the present invention, which was devised to obviate the problems inherent in the prior art described above, to provide a program development environment capable of preventing a decline of operation efficiency even when developing an application program by utilizing components having a multiplicity of interfaces.

It is another object of the present invention to provide functions of developing an unitarily designed application program even when utilizing the components, in which a multiplicity of interfaces can be utilized, and a multiplicity of combinations can be provided.

It is a further object of the present invention to enhance a maintainability of the application program through such a development.

To accomplish the above objects, according to one aspect of the present invention, a program development device for developing an application program by use of components having a plurality of interfaces, comprises a component selecting module for selecting the component, an interface selection module for having the interface selected for the selected component, and setting the selected interface in a valid or invalid state, a recording unit for retaining a set record of having set the interface in the valid or invalid state, and a edit module for supporting the development of the program by use of the interface set in the valid state or the interface that is not set in the invalid state in accordance with the set record.

Preferably, the program development device may further comprise a specifying module for specifying one of the plurality of set records.

The edit module may support the development of the program by use of the interface set in the valid state in the specified set record or the interface that is not set in the invalid state.

Preferably, the program development device may further comprise a group definition module for defining a group consisting of a plurality of users, and a group specifying module for specifying a usable set record with respect to the group.

According to another aspect of the present invention, a program development device for developing an application program by combining components having a plurality of interfaces, comprises a layout component selection module for selecting the layout component which lays out a plurality of components to be laid out, a laid-out component selection module for selecting the plurality of components to be laid out in the selected layout component, a prescribing module for prescribing a layout specification for laying out the laid-out components, a recording unit for retaining a layout specification record of the prescribed layout specification, and a edit module for supporting a development of the program by laying out the laid-out components in the layout component in accordance with the layout specification record.

Preferably, the program development device may further comprise a specification designating module for designating one of a plurality of layout specification records.

The edit module (120) may support the development of the program by use of the layout specification prescribed in the designated layout specification record.

Preferably, the program development device may further comprise a group definition module for defining a group consisting of a plurality of users, and a specification designating module for designating the layout specification record usable for the group.

According to still another aspect of the present invention, a program development method of developing an application program by use of components having a plurality of interfaces, comprises a step (S3) of selecting the component, a step (S6) of selecting the interface for the selected component, a step (S7) of setting the selected interface in a valid or invalid state, a step (S8) of recording the valid or invalid setting, and a step (S21–S28) of developing the program by use of the interface set in the valid state or the interface that is not set in the invalid state in accordance with the above setting.

According to a further aspect of the present invention a program development method of developing an application program by combining components having a plurality of interfaces, comprises a step (S11) of selecting the component which lays out a plurality of components and to be laid out, a step (S12) of selecting the plurality of components to be laid out in the selected layout component, a step (S13) of prescribing a layout specification for laying out the laid-out components, a step (S16) of recording the prescribed layout specification, and a step(S21–S28) of developing the program by laying out the laid-out components in the layout component in accordance with the layout specification.

According to a still further aspect of the present invention, there is provided a readable-by-computer recording medium recorded with a program executed by a computer, comprising the steps described above.

According to a yet further aspect of the present invention, there is provided a data communication signal embodied in a carrier wave containing a program code module executed by a computer, comprising the steps described above.

As explained above, the contrivance according to the present invention is to limit the component interfaces to be utilized and the combination modes of the components, thereby making it possible to facilitate searching the interface and enhance an operation efficiency. Further, according to the present invention, operations of the components used for the application program can be unified. As a result, according to the present invention, the maintainability is enhanced.

The present invention exhibits effects especially in a group-oriented development for developing one single system by a plurality of users.

BRIEF DESCRIPTION OF THE DRAWINGS

FIG. 6 is a diagram showing an example (1) of a style definition file 11;

FIG. 10 is a diagram showing an example (2) of the style definition file 11;

DETAILED DESCRIPTION OF THE PREFERRED EMBODIMENTS

Preferred embodiments of the present invention will hereinafter be described with reference to the accompanying drawings.

First Embodiment

Figure 1:
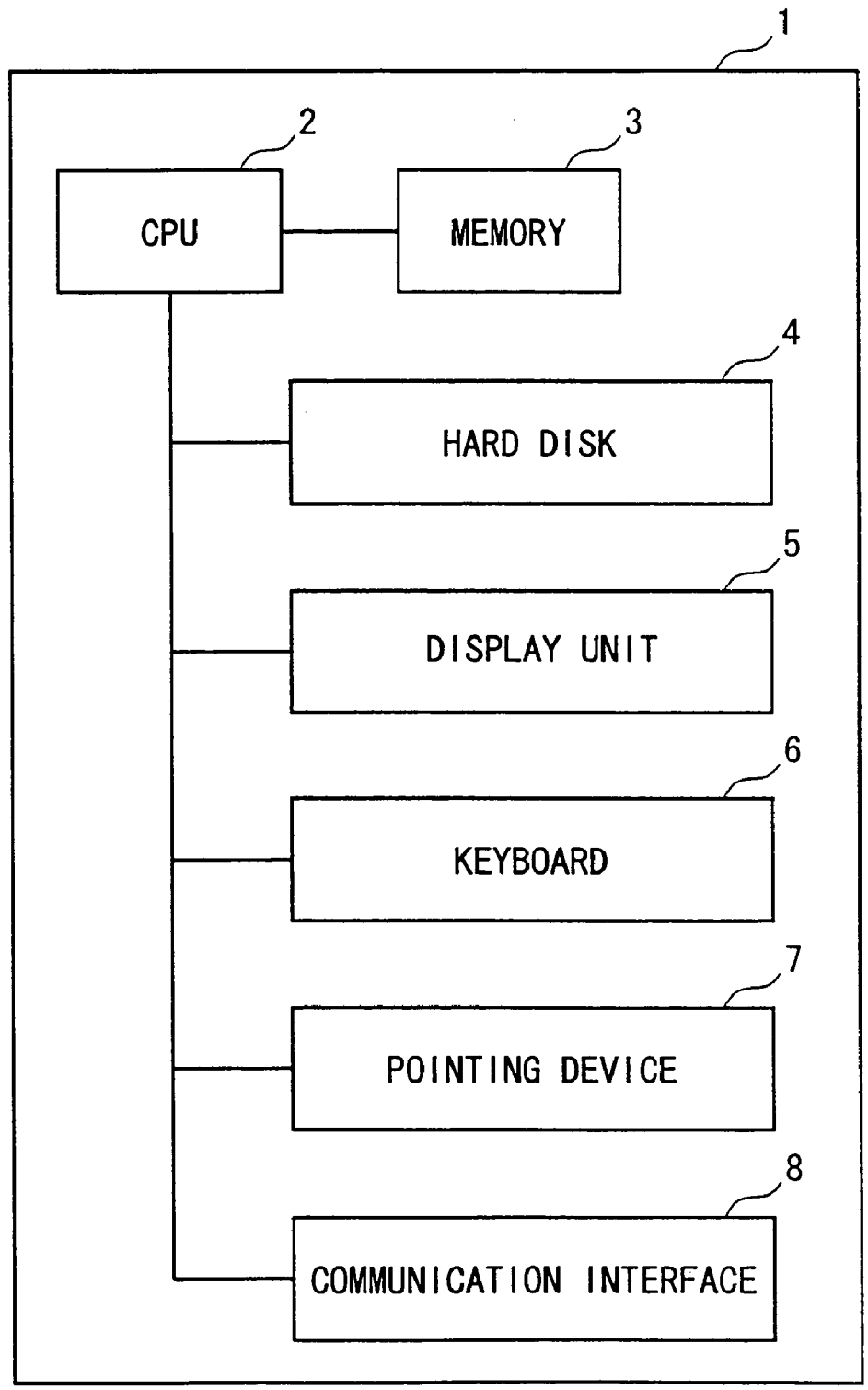
FIG. 1 is a diagram showing a hardware architecture of a program development device 1 in a first embodiment of the present invention.
Figure 2:
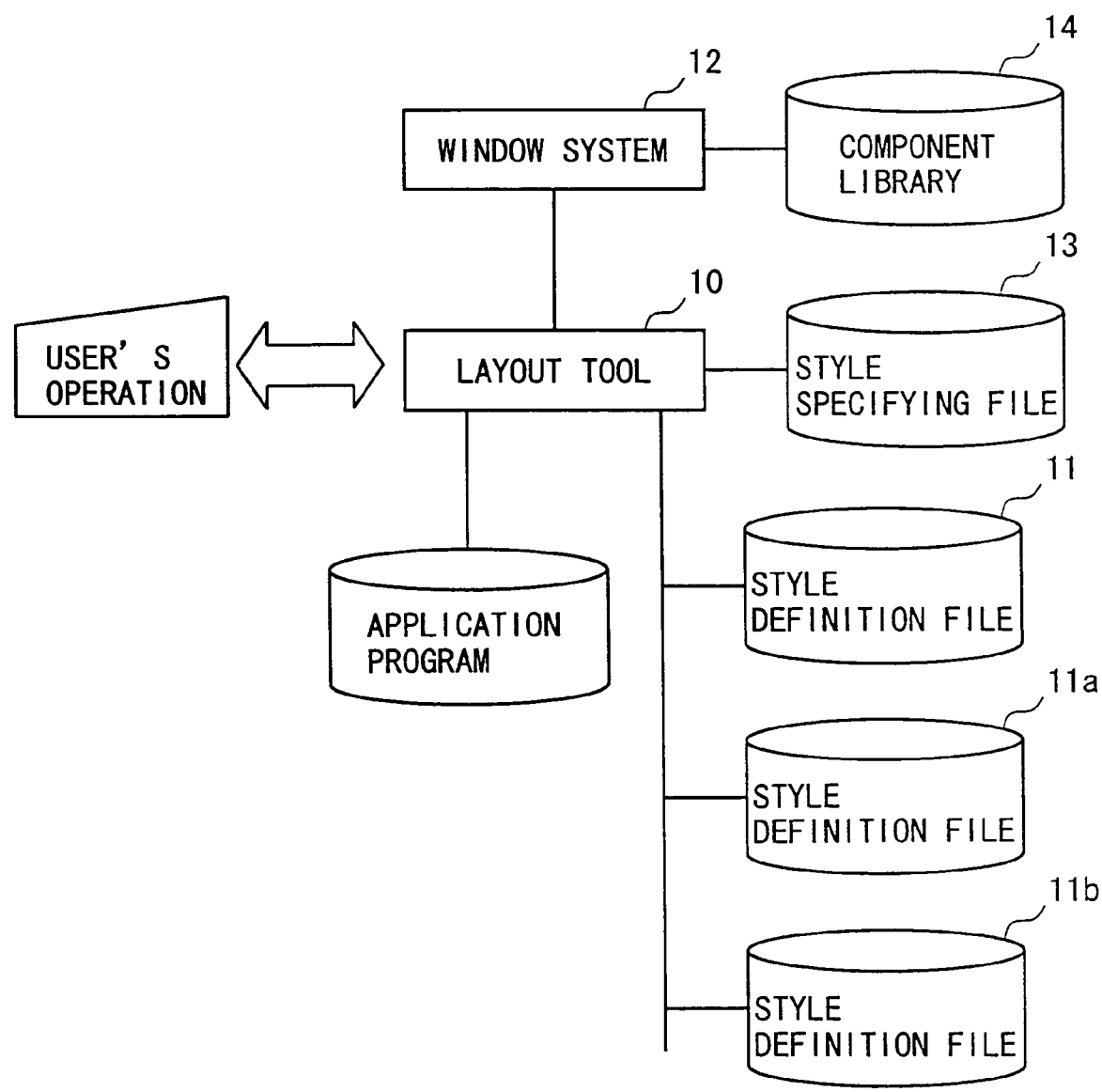
FIG. 2 is a diagram showing a functional architecture of the program development device 1.
Figure 3:
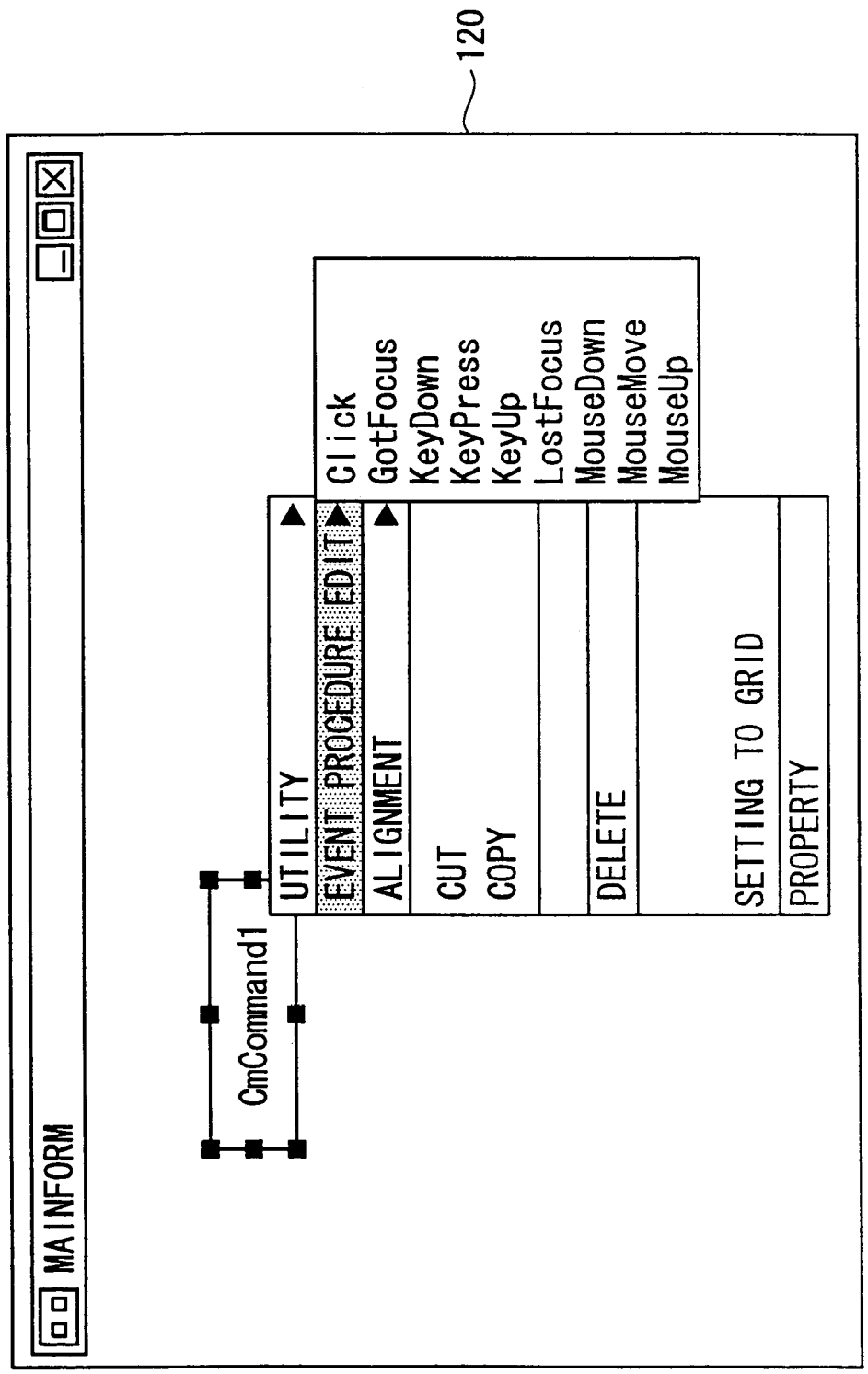
FIG. 3 is a diagram showing a layout example (1) of components by a layout tool 10.
Figure 4:
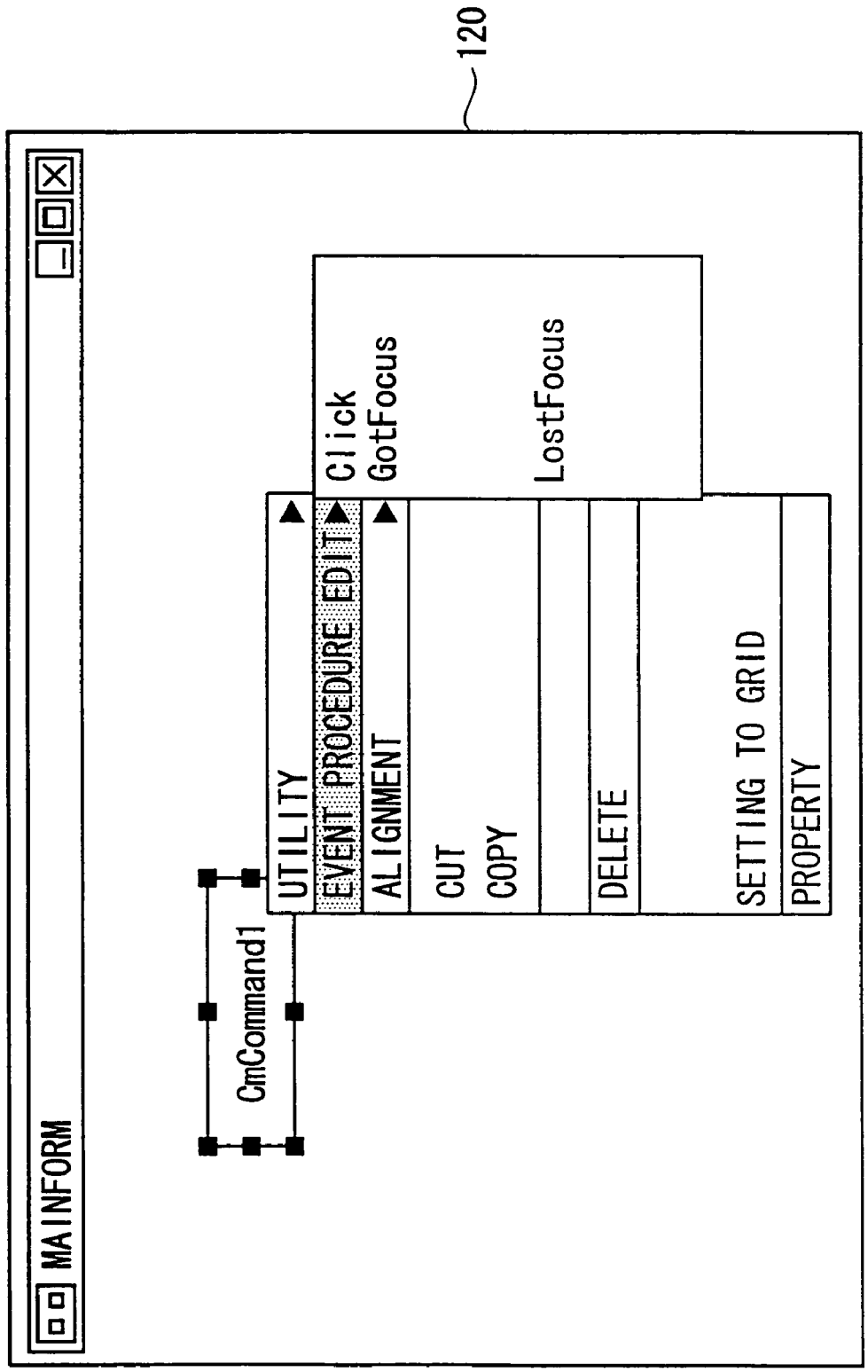
FIG. 4 is a diagram showing a layout example (2) of the components by the layout tool 10.
Figure 5:
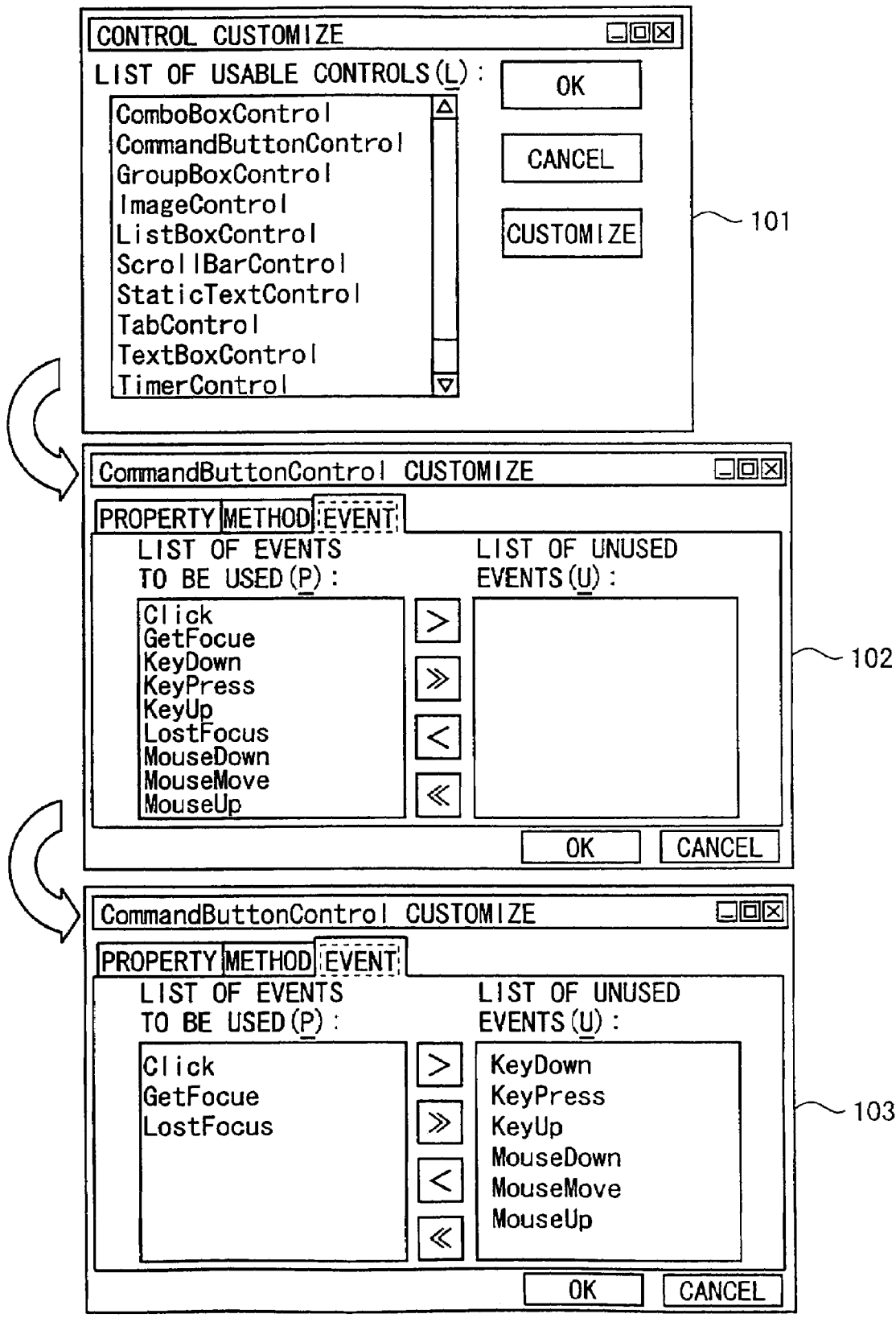
FIG. 5 is a diagram showing an operational example of setting a style for the component.
Figure 7:
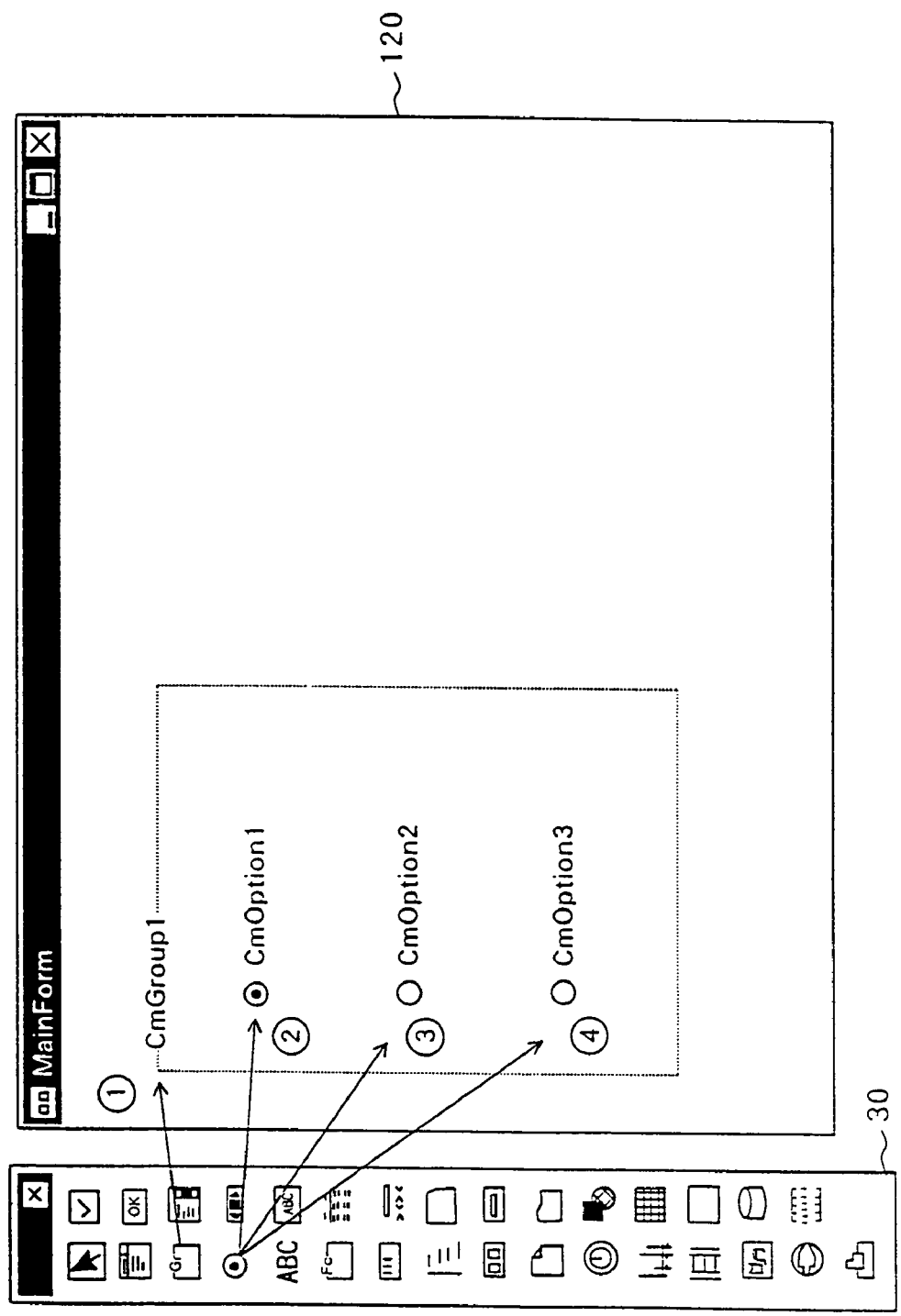
FIG. 7 is a diagram showing a layout example (1) of a group component by the layout tool 10.
Figure 8:
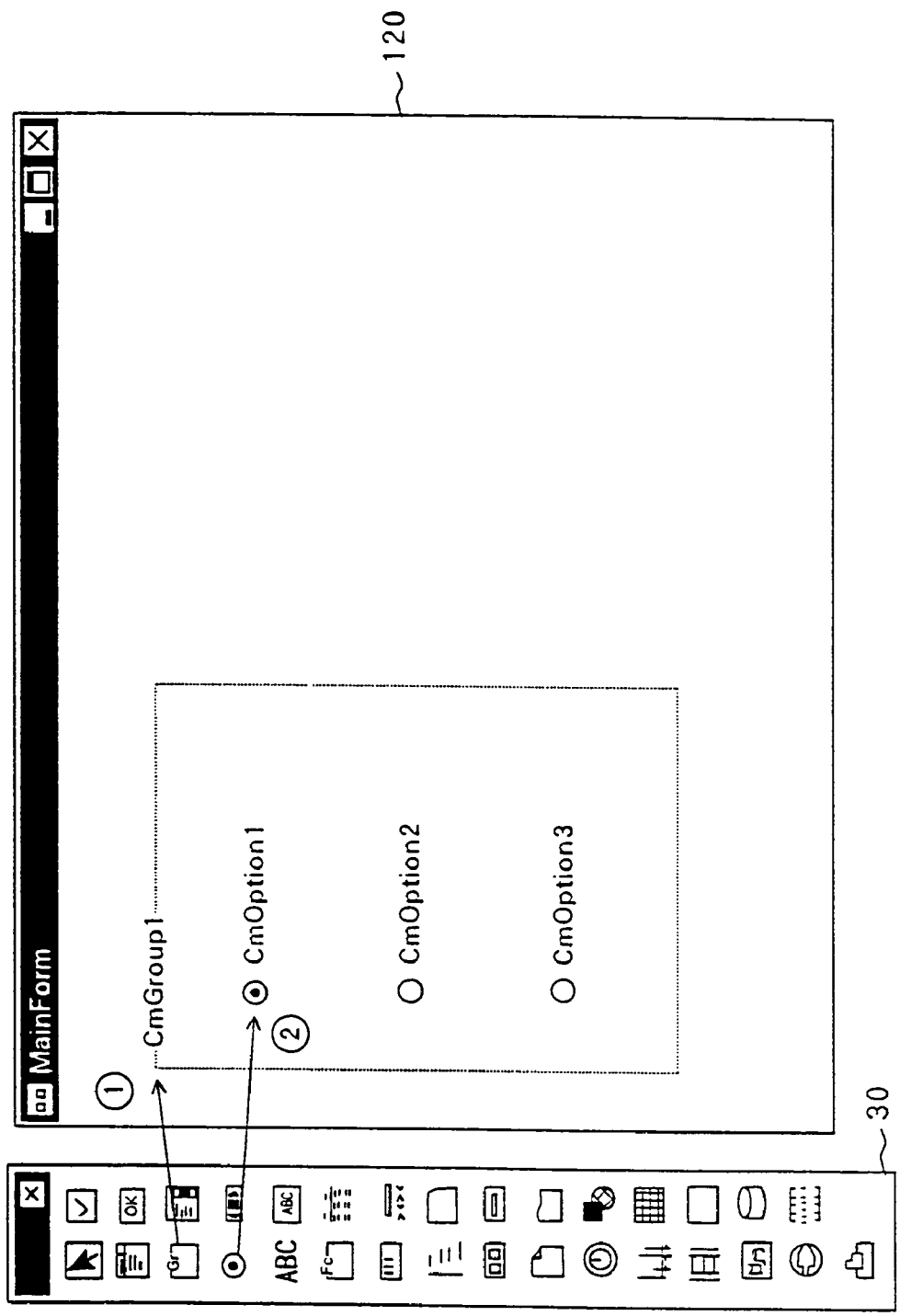
FIG. 8 is a diagram showing a layout example (2) of the group component by the layout tool 10.
Figure 9:
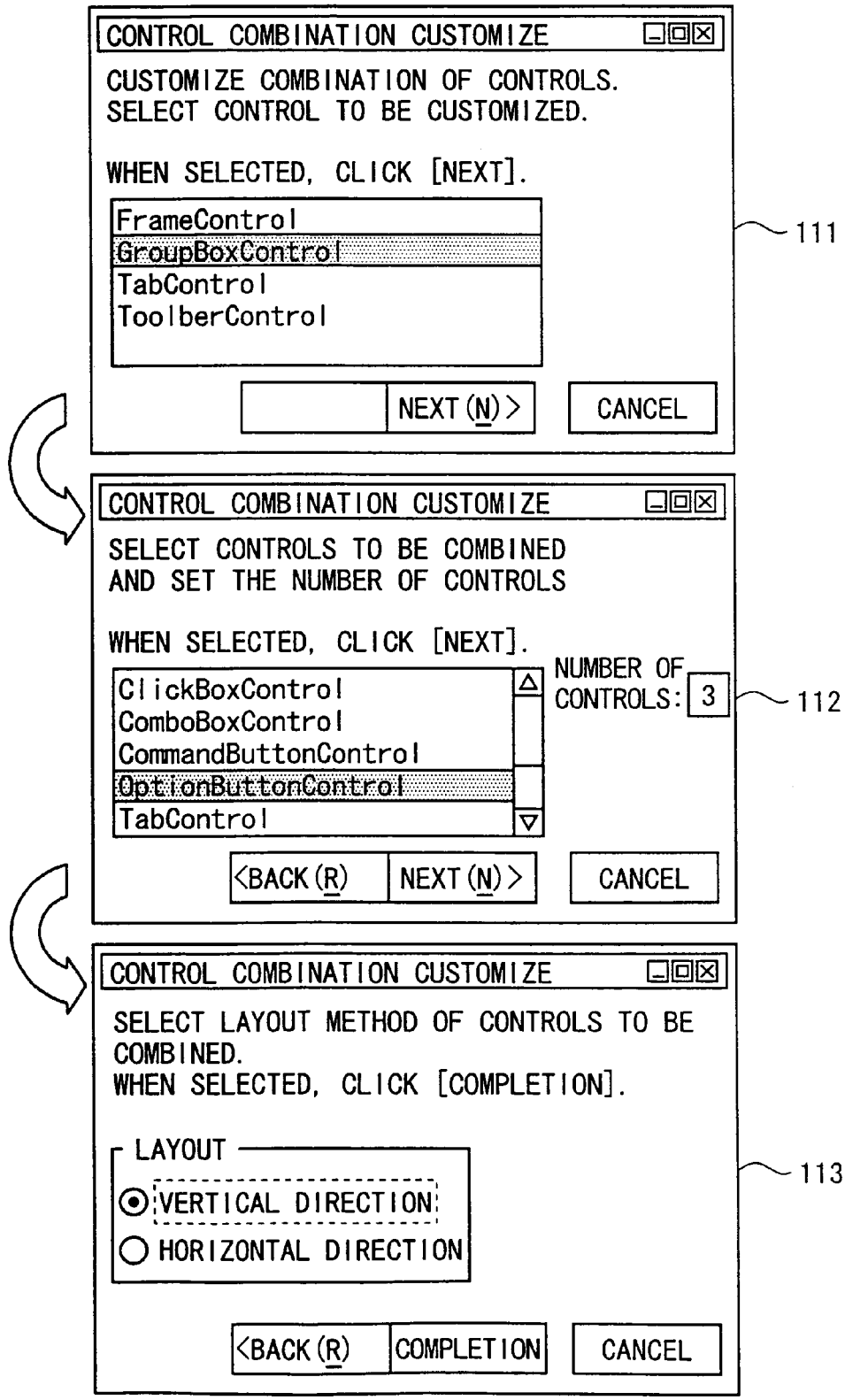
FIG. 9 is a diagram showing an operational example of setting a style for the group component.
Figure 11:
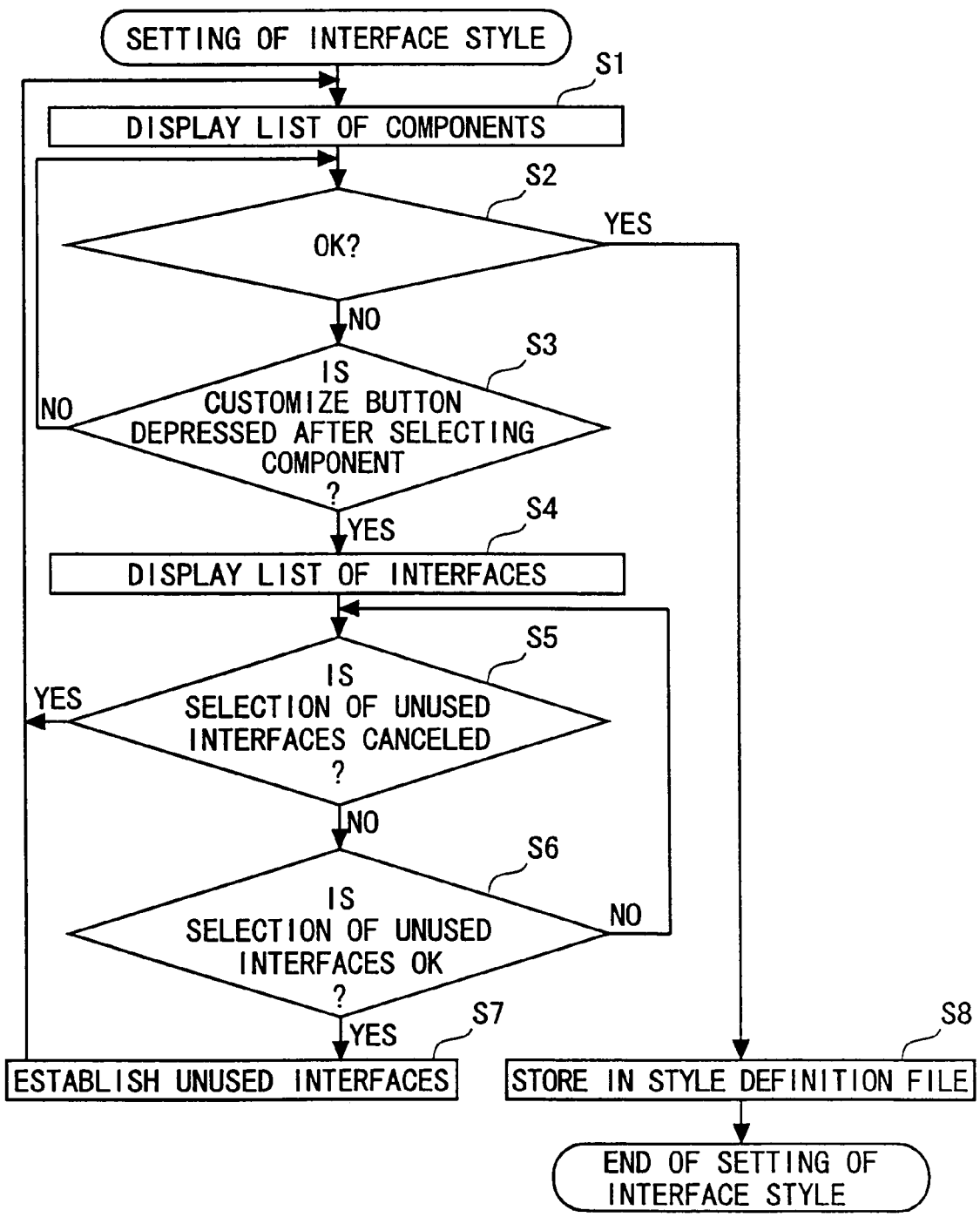
FIG. 11 is a flowchart (1) showing a process of the layout tool 10 when in the style setting operation.
Figure 12:
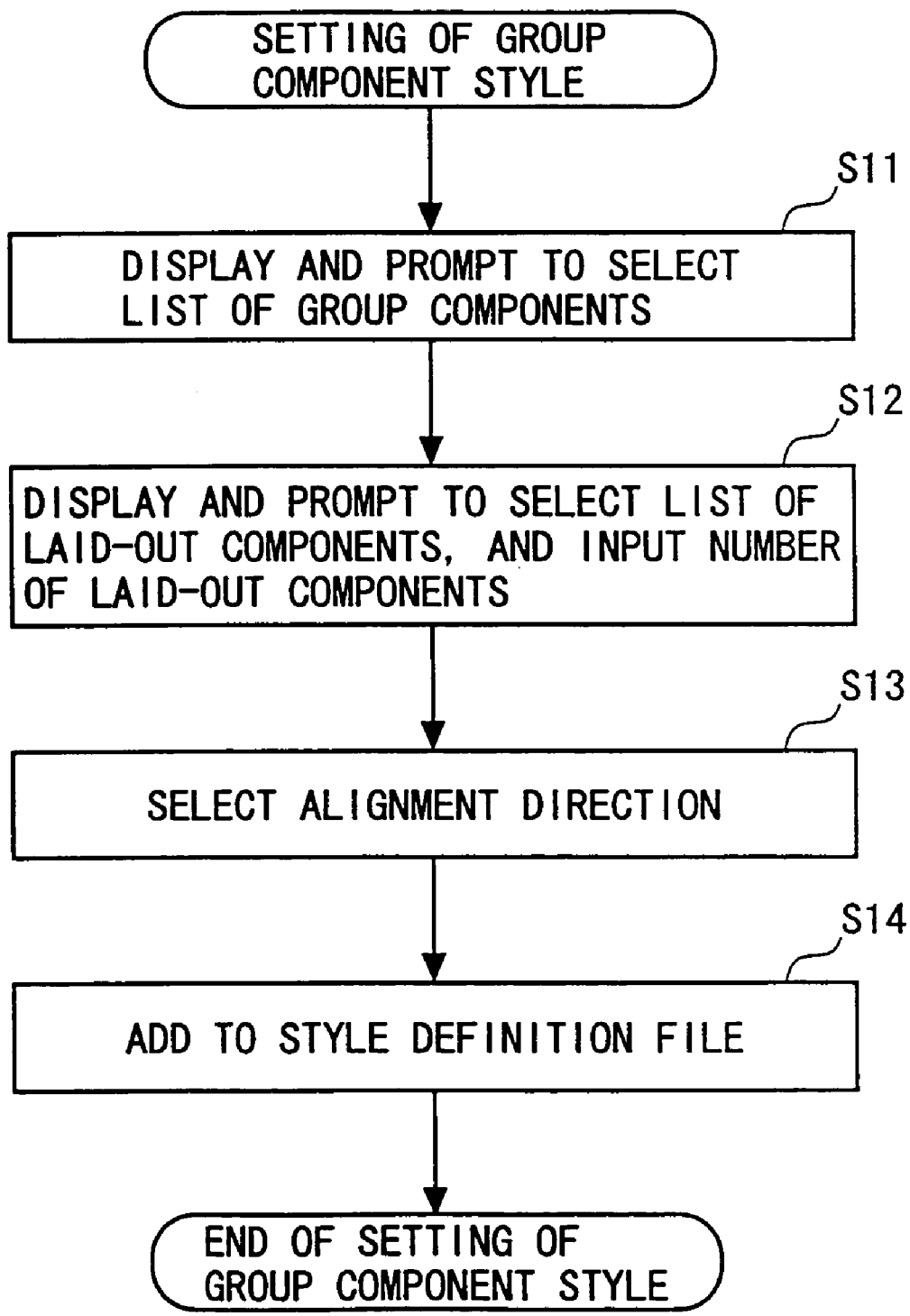
FIG. 12 is a flowchart (2) showing the process of the layout tool 10 when in the style setting operation.
Figure 13:
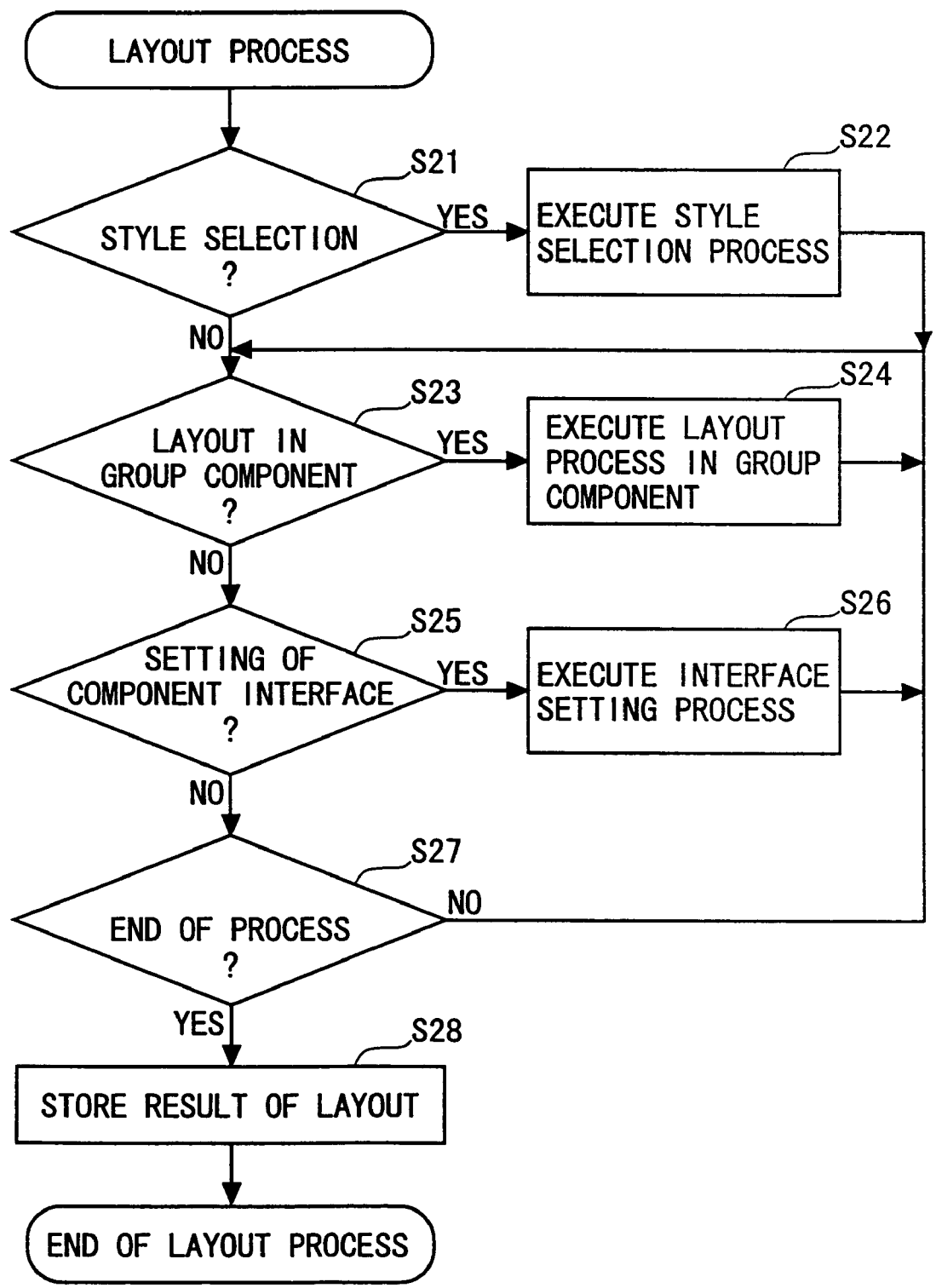
FIG. 13 is a flowchart showing a process of the layout tool 10 when developing a program.

A first embodiment of the present invention will be discussed referring to FIGS. 1 through 13. FIG. 1 is a diagram showing a hardware architecture of a program development device 1 in the first embodiment. FIG. 2 is a diagram showing a functional architecture of the program development device 1. FIGS. 3 and 4 are diagrams each showing an example of layout of a component by a layout tool 10 shown in FIG. 2. FIG. 5 is a diagram showing an example of operation of setting a method(which will hereinafter be termed a "style") of using the component. FIG. 6 is a diagram showing an example of a style definition file 11 for defining the style set in FIG. 5. FIGS. 7 and 8 are diagrams each showing an example of a group component layout by the layout tool 10. FIG. 9 shows an example of the operation of setting the style with respect to the group component. FIG. 10 shows an example of the style definition file 11 for defining the style set in FIG. 9. FIGS. 11 and 12 are flowcharts each showing a process by the layout tool 10 when in the operation of setting the style. FIG. 13 is a flowchart showing a process for the layout tool 10 to lay out the components when developing a program.

<Hardware Architecture>

FIG. 1 is the diagram showing the hardware architecture of the program development device 1. This program development device 1 includes a CPU 2 for executing a program, a memory 3 for storing the program executed by the CPU 2 and data processed by the CPU 2, a hard disk 4 for recording the program and the data, a display unit 5 for displaying pieces of information such as menus, icons, messages etc, a keyboard 6 for inputting character data, a pointing device 7 for manipulating the menus and icons on the display unit 5, and a communication interface 8 for accessing a network.

The CPU 2 executes the program stored in the memory 3, thereby providing a function as the program development device 1.

The memory 3 is stored with the program executed by the CPU 2 and the data processed by the CPU 2.

The hard disk 4 records the program executed by the CPU 2 and the data processed by the CPU 2.

The display unit 5 displays information inputted by a user, and the information such as the menus, icons, messages etc of a program developed by the user. The display unit may involve the use of, e.g., a CRT (Cathode Ray Tube), a liquid crystal display and so on.

The keyboard 6 is used for inputting the character data. The pointing device 7 is used for manipulating the menus and the icons displayed on the display unit 5. The pointing device 7 may be exemplified such as a mouse, a trackball, an electrostatic pointing device (touch pad), a laser type pointing device, a touch panel etc.

In response to a command given from the CPU 2, the communication interface 8 accesses the network and performs communications with other hosts in the network.

<Functional Architecture>

FIG. 2 is the diagram showing the functional architecture of the program development device 1. The CPU 2 implements the window system 12 and the layout tool 10 linked to the window system 12, whereby the program development device 1 is actualized.

The window system 12 displays the information to the display unit 5, and detects an event that the user manipulates the keyboard 6 and the pointing device 7. Further, the window system 12 has a component library 14 retained within the hard disk 4.

The component library 14 is stored with a multiplicity of components and is open to the users. The user uses the component as a software part when developing an application program.

The layout tool 10 searches the components in the component library 14, and creates a program by combining these components.

The user manipulates elements on the screen of the layout tool 10 by use of the display unit 5, the keyboard 6 and the pointing device 7, thereby developing a user interface of the program.

What is known as the component may include, e. g., a button, a pull-down menu, a pop-up menu, a list etc. Further, each component incorporates a variety of functions for configuring the user interface (which will hereinafter be referred to as the interface).

The interface may be categorized down into a property, a method and an event. The property is defined as attributes of the component, which are, e.g., a foreground color, a background color, dimensions, etc.

The method is defined as a function for operating each component. This may be exemplified such as a method of setting a value in the component from the application program, a method of reading the value set therein, and so forth.

The event is defined as a category of the user's manipulation detected by the component. The events are, for example, a move of an indication (called a pointer) on the screen that corresponds to the manipulation of the pointing device 7, a move-in and move-off of the pointer with respect to an on-screen display area of the component, a depression on the button of the pointing device 7 in the display area, an operation of the keyboard 6, etc.

In the first embodiment, the layout tool 10 searches a plurality of style definition files 11, and a style specifying file 13 for specifying any one of the style definition files 11.

A first characteristic of the present layout tool 10 is to provide a function for limiting a multiplicity of interfaces included in the multiplicity of components to those usable. The limit to the usable interfaces leads to a restraint of developers. As a result, a unity of the operations occurs in the application programs to be developed. In this circumstance, this kind of restraint may be called a style in the first embodiment. Further, setting the restraint may be called a setting of the style.

A component category other than the component simply functioning to display the information to the user and to detect the user's operation, is that a new component is configured by combining and laying out other components. These components are categorized as a group component. Further, the components, which are laid out by the group component, are called laid-out components. A layout method by which the group component lays out the laid-out components may be diversified.

A second characteristic of the present layout tool 10 is that the group component is provided with a function of restricting the layout method for the laid-out components. This kind of restriction is also called a style as in the case of the interface described above.

The above styles defined by the layout tool 10 are stored in the style definition file 11. The style definition file 11 is capable of defining styles with respect to one or larger arbitrary number of components. Further, different style definition contents can be stored in different name style definition files 11*a*, 11*b* etc.

The layout tool 10 stores the style specifying file 13 with information for specifying which style definition file 11 should be used at the present. The layout tool 10 selects the style definition file in accordance with the indication given by the style specifying file 13, thereby assisting the user to develop a program.

<Styles of Interface>

FIG. 3 shows an operational example showing how the layout tool 10 lays out the components. In this example, one single button named CmCoomand1 is disposed in an edit window 120 named MainForm. The layout tool 10 is capable of defining an event detected by this button. Such a definition is executed by "Event Procedure Edit" in a pull-down menu in FIG. 3.

In the example shown in FIG. 3, the style is not set in the layout tool 10. Accordingly, when the user selects "Event Procedure Edit", a multiplicity of events such as Click, GotFocus etc can be selected. In this state, all the events embraced by the button CmCommand1 are originally usable.

FIG. 4 shows an example of the edit window 120 in which the usable events are limited. In the example shown in FIG. 4, the usable events are only three events of Click, GotFocus and LostFocus. In this case, the user is able to select these usable events in the edit window 120.

FIG. 5 shows an operational example of setting the styles as shown in FIG. 4. The user starts the layout tool 10 and selects "customization" of control from an unillustrated menu, at which time a component screen 101 is displayed. The "Customization" of control is herein a function of setting the style for the interface.

A list of the interfaces in which the styles can be set is displayed on the component screen 101 (which is titled "List of Usable Controls" in FIG. 5). When the user selects a desired component, e.g., "CommandButton Control" and depresses a "customize" button, an unused interface set screen 102 is displayed.

Referring to FIG. 5, a list of events usable with a component named "CommandButton Control" is displayed on the unused interface set screen 102. Herein, when the user selects an unused event and depresses a ">" button provided at the center, that event moves to a "List of Unused Events" box. When depressing a ">>" button, all the events move to "List of Unused Events" box.

The events moved to the "List of Unused Events" box can be moved back to a "List of Events for Use" box by depressing a button "<" or "<<" provided at the center. Thus, as seen on the unused interface set screen 103, when the user depresses and "OK" button while only Click, GetFocus and LostFocus are left in the "List of Events for Use", thereby establishing the setting of this style.

The user repeats the operations described in FIG. 5, and, after setting the styles for the plurality of components, depresses the OK button on the component screen 101. Then, the layout tool 10 inquires of a name of the style definition file for storing the styles. When the user inputs the name of the style definition file, a newly defined style is added to the style definition file. Thereafter, the layout tool 10 finishing the customization.

FIG. 6 shows a definition example (1) of the style definition file created by the setting operation described above. In this style definition file 11, it is specified that, for example, a key depression (KeyDown), a state of the key kept depressed (KeyPress) and a key release (KeyUp) on the keyboard 6, are not used as events (indicated by "CommandButton.Events") of the component named "CommandButtonControl". It is also specified that a depression of the mouse button (MouseDown), a move of the mouse (MouseMove) and a mouse button release are not used as the events.

Further, it is specified in this style definition file 11 that a method "Move" among methods (indicated by "CommandButton.Methods") of the component "CommandButtonControl", is not used.

Moreover, in this style definition file 11, among properties (indicted by "ComboBox.Properties") of the component named "ComboBoxControl", a property named "Style" is set to "2". Further, a method "Move" among methods (indicated by "ComboBoc.Methods") of the component "ComboBoxControl", is not used.

<Style of Group Component>

FIG. 7 shows an operational example of the edit window 120 in which the layout tool 10 lays out the components within the group component. FIG. 7 shows the operational example of the edit window 120 in which any style is not specified for the group component.

In this operation, the user, to begin with, picks up a group component named "GroupControl" (CmGroup) out of a selection box 30 for selecting the components and disposes this group component in "MainForm". Further, the user draws three pieces of components named "OptionButtonControls" (CmOption1, CmOption2, CmOption3) out of the selection box 30, and lays out CmOption1, CmOption2 and CmOption3 vertically in "GroupControl" (CmGroup1).

Thus, normally when laying out the components in the group component, the user must repeat the operations corresponding to the number of components to be disposed. Further, the user is able to specify an alignment direction and an alignment position as the user intends.

FIG. 8 shows an operational example of the edit window 120 when a layout specification is set in the style definition file 11. In this operation also, as laid out in FIG. 7, three pieces of components named "OptionButtonControls" (CmOption1, CmOption2, CmOption3) are laidout in the group component named "GroupControl" (CmGroup).

In the edit window 120 shown in FIG. 8, however, a layout specification (that the three components should be disposed vertically at a predetermined interval) of "OptionButtonControls" is set in the style definition file 11. Accordingly, the user draws one piece of "OptionButtonControl" out of the selection box 30, and disposes it in "GroupControl", at which time the remaining two pieces of "OptionButtonControls" are automatically vertically laid out.

FIG. 9 shows an operational example of setting a style as shown in FIG. 8. When the user starts the layout tool 10 and selects "customization" of group control from an unillustrated menu, a group component selection screen 111 is displayed (the screen titled "Combination Control Customize" is displayed in FIG. 9).

A list of group components in which the styles can be set is displayed on the group component selection screen 111. The user selects a desired group component, e.g., "GroupBoxControl" and depresses a "Next" button, and a laid-out component selection screen 112 is displayed.

A list of the components that can be laid out in the group component named "GroupBoxControl", is displayed in the laid-out component selection screen 112. Herein, the user selects the components ("OptionButtonControl" in FIG. 9) to be laid out, and sets the number of the components to "3". Then, the user depresses the "Next" button, an alignment direction specifying screen 113 is displayed.

The user selects an alignment direction on the alignment direction specifying screen 113. Referring to FIG. 9, the vertical direction is selected. Thereafter, when depressing a "Completion" button, a layout specification of "OptionButtonControl" in the group component named "GrouptBoxControl", is established.

Then, the layout tool 10 inquires of a name of the style definition file for storing the styles. When the user inputs the name of the style definition file, a newly defined style is added to the style definition file 11. Thereafter, the layout tool 10 finishing the customization.

FIG. 10 shows a definition example (2) of the style definition file 11 created by the setting operation described above. This style definition file 11 prescribes a layout of option buttons (indicated by GroupBox.OptionButton) in the group component named "GroupBox". This example (2) specifies that the number of the option buttons is "3" (OptionButton=3), and the alignment direction is vertical (Alignment=Vertical).

Further, a layout of the command buttons (indicated by ToolBar.CommandButton) in the group component named "ToolBar" is specified. In this example, it is specified that the number of the command buttons is "4" (CommandButton=4), and an alignment direction is horizontal (Alignment=Horizontal).

<Application of Style Definition>

The layout tool 10 in the first embodiment stores batchwise the styles set for the plurality of components in the style definition file 11. Further, the layout tool 10 stores definition contents of different styles in the files given different names.

For instance, the style definition file 11 is stored with styles for developing an inventory control system. This is a program for supporting a raw material inventory management, a product inventory management and a supplier/destination management. Styles for unifying the operation of the inventory management and for unifying the layout on the screen, may be defined in the style definition file 11. Then, the members of this program development project share this style definition file 11.

Moreover, for example, styles of a reservation system development project for hotels, travels etc, are defined in a style definition file 11a. This is a system for searching information on empty rooms, inputting the reservation and a management of customer information. Styles for unifying the search for the empty room information and for unifying reserving operation etc, may be defined in the style definition file 11a.

Further, styles of, e.g., a work management system for the employees defined in a style definition file 11b. This is a system for executing a process of issuing notifications of a business trip, day-off etc and a process of searching a situation of taking the day-off and a working situation as for an overtime work, and for providing an employee-to-employee communication function such as an electronic bulletin board and mails. Styles for unifying operations for the work management etc may be defined in the style definition file 11b.

The user develops the application program within ranges of the interfaces permitted and of the layout method specified. In this case, the user is able to select the style definition files 11 separately corresponding to the development target programs. Namely, the user designates the name of the specified style definition file 11 in an unillustrated environment set menu of the layout tool 10.

Then, the layout tool 10 assists the user to develop the program by use of the interfaces specified to be usable in the designated style definition file 11 and of the layout specifications specified.

<Operation and Effect>

FIG. 11 shows a process of setting the style for the interface embraced by the component. When the user selects the customization of control from the unillustrated menu of the layout tool 10, the CPU 2 executes the process shown in FIG. 11.

To start with, the CPU2 displays the list of the components in which styles can be set (S1).

In this state, the CPU 2 stands by for a user's operation (S2, S3). When detecting the user's operation, the CPU 2 judges whether or not the user's operation is to depress the "OK" button (S2).

If the user's operation is the depression on the "OK" button (Yes in S2), the CPU 2 adds the present setting to the style definition file 11 (S8), thereby finishing the process of setting the style for the interface.

Whereas if the user's operation is not the depression on the "OK" button, the CPU 2 judges whether or not the user depresses a "customize" button after selecting the component (S3). If the user does not depress the "customize" button after selecting the component (No in S3) the CPU 2 returns the control to the standby status for the user's operation.

If it is judged in S3 that the user depresses the "customize" button after selecting the component, the CPU 2 displays a list of the interfaces usable by the selected component (S4). In this state, the CPU 2 comes gain to the standby statue for the user's operation (S5, S6). That is, herein, the CPU 2 waits for the user to select an unused interface.

If the user's operation is to cancel the selection of the unused interface, the CPU loops the control back to S1.

If the user's operation is "OK" of the selection of the unused interface, the CPU 2 establishes the unused interface designated (S7). The establishment is in terminology herein to read from the screen the designation of the unused interface set as on the unused interface set screen 103 in FIG. 5. Then, the CPU loops the control back to S1.

FIG. 12 shows a process of setting the style for the group component. When the user starts the layout tool 10 and selects the customization of the group control from an unillustrated menu, the CPU 2 executes the process shown in FIG. 12.

At first, the CPU2 displays a list of the group components, and prompts the user to select the group component (S11).

When the user depresses the "Next" button (see FIG. 9) the CPU 2 displays a list of the laid-out components to be laid out in the group component, and prompts the user to select the laid-out components (S12). Further, the CPU 2 prompts the user to input the number of the laid-out components to be laid out.

Moreover, when the user depresses the "Next" button, the CPU 2 makes the user specify an alignment direction (S13).

Further, when the user depresses the "Completion" button, the set style is added to the style definition file 11 (S14) thereby finishing the process.

On the other hand, on each of the screen for selecting the group component, the screen for selecting the laid-out components and the screen for specifying the number of the laid-out component to be laid out, when depresses a "Return" button (see FIG. 9), the CPU 2 sets each control back to the previous screen. When the user depresses the "cancel" button (see FIG. 9) on any screen, the CPU2 executes nothing and finishes the processing.

FIG. 13 shows a process on the occasion of developing the program by laying out the components. When the user starts the layout tool 10 and selects a layout of the components from an unillustrated menu, the CPU 12 executes the process in FIG. 13.

In this process, the CPU 2 at first judges whether or not the user selects the style (S21). The selection of the style implies a selection based on any one of the plurality of style definition files 11.

When the user selects the style, the CPU 2 displays the list of the style definition files 11 on the display unit 5, and prompts the user to select the file 11 (S22). Thereafter, the CPU 2 advances the control to S23.

On the other hand, if the user does not select the style in S21, the CPU 2 keeps the style used as it is, or keeps an unused state of the style. Then the CPU 2 advances the control to S23. The style used as it is, is the style when the layout tool 10 is used last time. The unused state of the style is a state where the style is not yet used only once, and the interface and the group components are kept usable limitlessly.

Steps S23 through S27 show the standby status of the user. When detecting the user's operation, the CPU 2 at first judges whether or not the user's operation is a selection of the layout of the laid-out components in the group component (S23).

If the user's operation is the selection of the layout in the group component, the CPU 2 executes a layout process in the group component (S24). In this process, based on the designated style definition file 11, the laid-out components specified by the user are laid out within the group component specified by the user. There after, the CPU2 returns the control to S23.

Whereas if judging that the user's operation is not the selection of the layout in the group component, the CPU 2 judges whether or not the user's operation is a selection of setting the interface of the component (S25).

If the user's operation is the selection of setting the interface, the CPU2 executes the interface setting process (S26) In this process, the CPU 2, based on the designated style definition table 11, set the interface specified by the user in the component specified by the user, and embeds the component into the screen (e.g., MainForm, etc). Thereafter, the CPU 2 returns the control to S23.

Whereas if the user's operation is not the selection of setting the interface, the CPU 2 judges whether or not the user's operation is an indication of ending the process (S27).

If the user's operation is not the indication of ending the process, the CPU 2 loops the control back to S23. While on the other hand, if the user's operation is the indication of ending the process, the CPU 2 stores a result of the layout (S28), and finishes the layout process.

As discussed above, according to the program development device 1 in the first embodiment, the interfaces usable in the components and the layout specification of the components can be restricted beforehand.

As a result, the user has no necessity of being familiar with all of the numerous number of interfaces in the great number of components. The user may simply get deeper knowledge about the components and the interfaces that are defined in usage for the project in which the user himself or herself participates, thereby enhancing an efficiency of the development.

Further, according to this program development device 1, the user interfaces can be unified in a system developed by a plurality of members in a system developing project.

Moreover, according to this program development device 1, the user is able to freely select the style used by the user himself or herself. Therefore, for instance, the users participating in a plurality of development projects are able to use the styles for every project separately.

For example, a certain user may develop an inventory control system in the morning in accordance with the style definition file 11. Then, the same user may develop a reservation system for hotels and travels in the afternoon in accordance with the style definition file 11*a*. The present program development device 1 is capable of reducing a risk that the users developing the plurality of projects in parallel might confuse the specification of the user interfaces with each other.

<Modified Example>

According to the first embodiment, the style definition files 11 are stored on the hard disk 4 of the program development device 11. The embodiment of the present invention is not, however, confined to this mode. For instance, the style definition files 11 may be stored on a computer other than the program development device 1. That is, in an environment where the user develops a program by use of the plurality of program development devices 1 such as personal computers, the style definition files may be stored in a server in the network.

Second Embodiment

A second embodiment of the present invention will be described referring to FIG. 14. The first embodiment has exemplified the program development device 1 in which the user selects the style definition file 11 in the environment set menu of the layout tool 10 before developing the program, and then develops the program based on the selected file.

The second embodiment will exemplify a component-based program development in the network environment including the server. This server has a password file for identifying the users, and a group file for classifying the users.

Further, in the second embodiment, the user is unable to select the style definition file as the user intends and is confined to the style definition files 11 specified by a system administrator. Other configurations and operations are the same as those discussed in the first embodiment. Then, the discussion will be made with reference to the drawings in FIGS. 1 through 13 as the necessity may arise.

Figure 14:
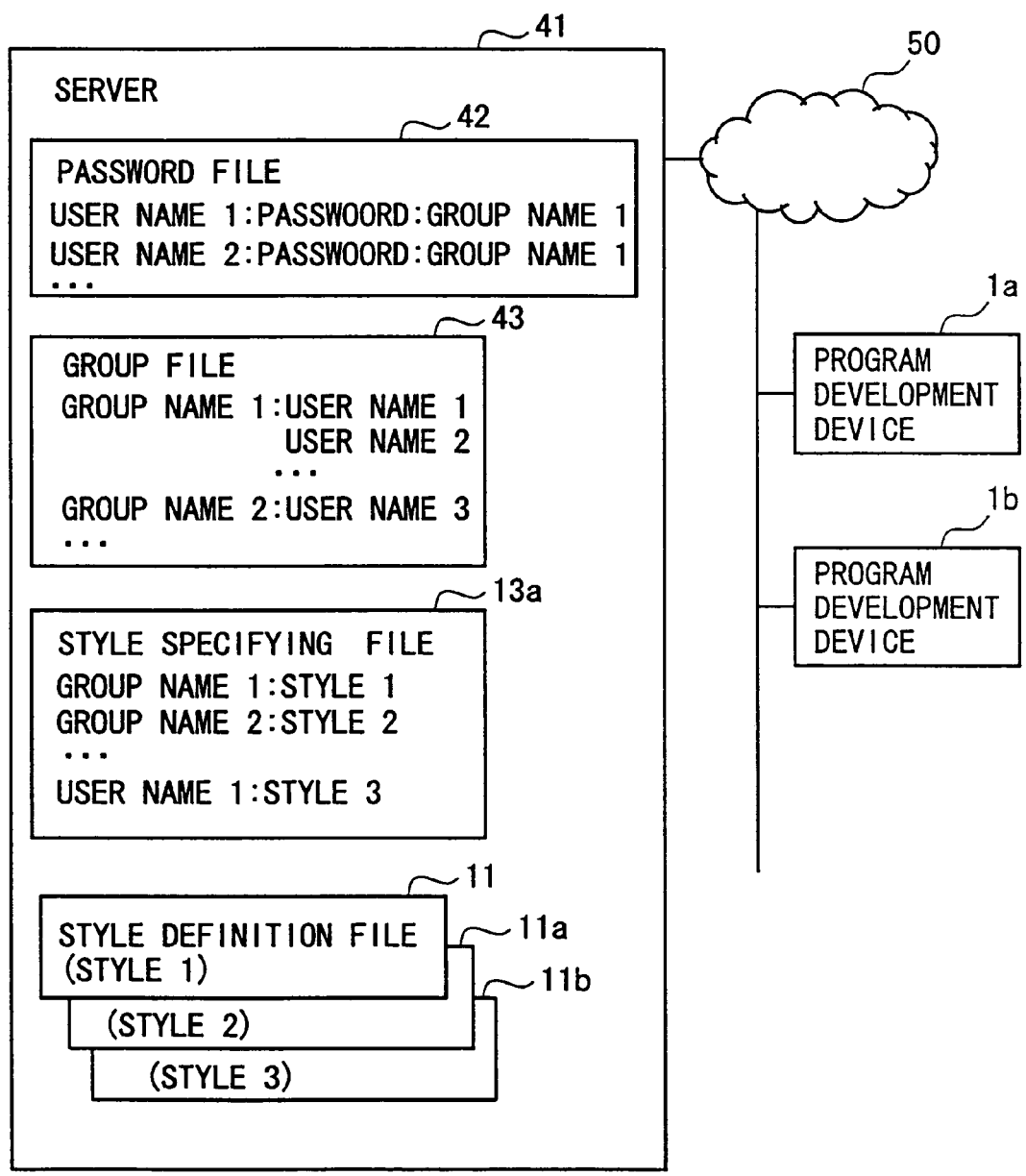
FIG. 14 is a diagram showing a system architecture of the program development device 1 in a second embodiment of the present invention.

FIG. 14 is a diagram showing a system architecture of the program development device in the second embodiment. This system is configured by a server 41 and a plurality of program development devices 1*a*, 1*b* etc connected via a network 50 to the server 41. The hardware architectures of the server 41 and of the program development devices 1*a* etc are the same as those shown in FIG. 1, and their repetitive explanations are omitted.

The server 41 incorporates a password file 42, a group file 43, a style specifying file 13*a* and a plurality of style definition files 11. The structure and function of the style definition file 11 are the same as those in the first embodiment, and their repetitive descriptions are omitted.

The password file 42 is recorded with combinations of user names and passwords of the users belonging to the system, and of group names of groups to which the users belong.

The intra-system group names and the user names of the users belonging to the groups are recorded in the group file 43.

Style names each used per group or user are specified in the style specifying file 13*a*. The style name is herein a name of the style definition file 11. This style specifying file 13*a* is set by the system administrator.

If the style is specified for one user by the user name and the name of the group to which the user belongs, the priority may be given to the specification by the user name.

Each individual user develops a program by using the layout tool 10 in the self program development device 1*a* etc. The layout tool 10, when started, accesses the server 41 via the network, and selects a style in accordance with an indication of the specifying file 13*a* on the server 41. After selecting the style, the user operates in the same way as in the first embodiment.

As discussed above, the server 41 is provided with the style specifying file 13*a*, whereby the styles of the users on the network can be managed unitarily. Further, the server 41 is provided with the style definition files 11, thereby eliminating the necessity of defining the style specifying file 13*a* individually in the program development devices 1*a*, 1*b* etc.

Moreover, the server 41 in the second embodiment specifies batchwise the style definitions files 11 with respect to the group to which the user belongs in addition to the specification of the style definition files 11 with respect to the user names. Hence, the style is not necessarily required to be set for each individual. It is therefore feasible to simplify the operation of specifying the style definition file 11.

<Modified Example>

The first embodiment has exemplified the case where the user freely selects the style to be used. Further, the second embodiment has exemplified the case where the server 41 is provided with the style definition files 11, and the administrator specifies the style used by each user. A program development environment may be configured by combining the first embodiment with the second embodiment.

The style specified by the style specifying file 13*a* of the server 41 is used as, e.g., default. The user is able to individually select a user's own style. The selected style is recorded in the server 41 or the program development device 1*a* etc. The user develops the program in accordance with the style selected in preference.

While on the other hand, the user who does not select the style follows a specification of the default given in the server 41. In the system thus configured, well-experienced users participating in a multiplicity of projects are allowed to freely select the style definition files 11, while less-experienced users forcibly follow the specified styles and thereby become capable of developing the programs.

<Readable-by-Computer Recording Medium>

The programs of the layout tool 10 in the embodiments discussed above can be recorded on a readable-by-computer recording medium. Then, the computer reads and executes the control programs on this recording medium, whereby the computer can be made to function as the program development device exemplified in each of the embodiments discussed above.

Herein, the readable-by-computer recording medium embraces recording mediums capable of storing information such as data, programs, etc. electrically, magnetically, optically and mechanically or by chemical action, which can be all read by the computer. What is demountable out of the computer among those recording mediums may be, e.g., a floppy disk, a magneto-optic disk, a CD-ROM, a CD-R/W, a DVD, a DAT, an 8 mm tape, a memory card, etc.

Further, a hard disk, a ROM (Read Only Memory) and so on are classified as fixed type recording mediums within the computer.

<Data Communication Signal Embodied in Carrier Wave>

Furthermore, the above programs may be stored in the hard disk and the memory of the computer, and downloaded to other computers via communication media. In this case, the program is transmitted as data communication signals embodied in carrier waves via the communication media. Then, the computer downloaded with this program can be made to function as the program development device in each of the embodiments described above.

Herein, the communication medium may be any one of cable communication mediums such as metallic cables including a coaxial cable and a twisted pair cable, and also an optical communication cable, or wireless communication media such as satellite communications, ground wave wireless communications, etc.

Further, the carrier waves are electromagnetic waves for modulating the data communication signals, or the light. The carrier waves may, however, be DC signals. In this case, the data communication signals take a base band waveform with no carrier wave. Accordingly, the data communication signal embodied in the carrier wave may be either a modulated broadband signal or an unmodulated base band signal (which corresponds to a case where the DC signal having a voltage of 0 is used as a carrier wave.

What is claimed is:

1. A program development device developing an application program using a component having a plurality of interfaces, comprising:
    a component selecting module having said component selected;
    an interface selection module having an interface selected for said selected component; and setting whether said selected interface is permitted to be embedded into said application program in accordance with preset information listing interfaces corresponding to said selected component, said setting including selecting at least one interface to be inhibited among the listing of said interfaces, and said interface selected being permitted to be embedded into a plurality of components used by said application program;
    a recording unit retaining a set record of said setting including whether said interface selected is permitted to be embedded into said application program based on said selecting of the at least one interface to be inhibited; and
    an edit module supporting development of the program using said interface set to be permitted to be embedded into said application program or that is not set to be inhibited to be embedded into said application program in accordance with the set record.

2. The program development device according to claim 1, further comprising a specifying module specifying one of the plurality of set records,
    wherein said edit module supports the development of the program by use of said interface set to be permitted to be embedded into said application program in the specified set record or said interface that is not set to be inhibited to be embedded into said application program in the specified set record.

3. The program development device according to claim 1, further comprising:
    a group definition module defining a group consisting of a plurality of users; and
    a group specifying module specifying a usable set record with respect to the group.

4. A program development method of developing an application program by use of a component having a plurality of interfaces, comprising:
    selecting said component;
    selecting an interface for said selected component;
    setting whether said selected interface is permitted to be embedded into said application program in accordance with preset information listing interfaces corresponding to said selected component, said setting including selecting at least one interface to be inhibited among the listing of said interfaces and said selected interface being permitted to be embedded into a plurality of components used by said application program;
    recording said setting including whether said selected interface is permitted to be embedded into said application program based on said selecting of the at least one interface to be inhibited; and
    developing the program using said interface set to be permitted to be embedded into said application program or that is not set to be inhibited to be embedded into said application program in accordance with said recording.

5. A readable-by-computer recording medium recorded with a program supporting a development of an application program by use of a component having a plurality of interfaces, said program executed by a computer, comprising:
    selecting said component;
    selecting an interface for said selected component;
    setting whether said selected interface is permitted to be embedded into said application program in accordance with preset information listing interfaces corresponding to said selected component, said setting including selecting at least one interface to be inhibited among the listing of said interfaces and said selected interface being permitted to be embedded into a plurality of components used by said application program;
    recording said setting including whether said selected interface is permitted to be embedded into said application program based on said selecting of the at least one interface to be inhibited; and
    developing the program using said interface set to be permitted to be embedded into said application program or that is not set to be inhibited to be embedded into said application program in accordance with said recording.

* * * * *

UNITED STATES PATENT AND TRADEMARK OFFICE
CERTIFICATE OF CORRECTION

| | |
|---|---|
| PATENT NO. | : 7,137,102 B2 |
| APPLICATION NO. | : 09/785207 |
| DATED | : November 14, 2006 |
| INVENTOR(S) | : Kunihiko Iizuka |

It is certified that error appears in the above-identified patent and that said Letters Patent is hereby corrected as shown below:

On the title page: Column 2 (Abstract), Line 13, after "and" change "a" to --an--.

Column 13, Line 29, change "component;" to --component--.

Column 13, Line 35, change "interfaces," to --interfaces--.

Signed and Sealed this

Thirteenth Day of March, 2007

JON W. DUDAS
*Director of the United States Patent and Trademark Office*